US012769673B2

(12) United States Patent
Gerhardt et al.

(10) Patent No.: US 12,769,673 B2
(45) Date of Patent: Oct. 20, 2026

(54) METHOD FOR ENCODING AND DECODING DATA

(71) Applicant: Robert Bosch Gmbh, Stuttgart (DE)

(72) Inventors: Christian Gerhardt, Reutlingen (DE); Michael Bunse, Vaihingen/Enz (DE)

(73) Assignee: Robert Bosch GmbH, Stuttgart (DE)

( * ) Notice: Subject to any disclaimer, the term of this patent is extended or adjusted under 35 U.S.C. 154(b) by 48 days.

(21) Appl. No.: 18/729,540

(22) PCT Filed: Jan. 27, 2023

(86) PCT No.: PCT/EP2023/051965
§ 371 (c)(1),
(2) Date: Sep. 10, 2024

(87) PCT Pub. No.: WO2023/144284
PCT Pub. Date: Aug. 3, 2023

(65) Prior Publication Data

US 2025/0094361 A1 Mar. 20, 2025

(30) Foreign Application Priority Data

Jan. 27, 2022 (DE) ..................... 10 2022 200 893.6

(51) Int. Cl.
*G06F 13/10* (2006.01)

(52) U.S. Cl.
CPC .......... *G06F 13/10* (2013.01); *G06F 2213/40* (2013.01)

(58) Field of Classification Search
None
See application file for complete search history.

(56) References Cited

U.S. PATENT DOCUMENTS 6,624,768 B1 9/2003 Meine et al.
2020/0175356 A1 6/2020 Koehler et al.
2024/0089608 A1 * 3/2024 Yin ........................ H04N 25/58

FOREIGN PATENT DOCUMENTS

WO 2004008436 A1 1/2004

OTHER PUBLICATIONS

Gholami, et al.: "A Survey of Quantization Methods for Efficient Neural Network Inference," Low-Power Computer Vision: Improve the Efficiency of Artificail INtelligence, USA, Chapman & Hall/ CRC; pp. 1-33, (2022), aeXiv:2103.13630v3.

(Continued)

*Primary Examiner* — Scott C Sun
(74) *Attorney, Agent, or Firm* — Norton Rose Fulbright US LLP

(57) ABSTRACT

Methods for encoding and decoding data. The encoding includes: receiving a datum representing a numerical value from a predefined maximum value range; selecting an encoding rule for the datum; encoding the numerical value of the datum based on the selected encoding rule by omitting all binary positions of the numerical value considered as a binary number that are of lower significance than a binary position used for the binary representation of a lower limit of a value range of the selected encoding rule, and all binary positions of the numerical value considered as a binary number that are of higher significance than a binary position used for the binary representation of an upper limit of the value range of the selected encoding rule; and extending the binary number of the encoded numerical value at a predefined position by predefined encoding information which uniquely identifies the encoding rule used.

10 Claims, 2 Drawing Sheets

(56) References Cited

OTHER PUBLICATIONS

International Search Report issued in PCT/EP2023/051965 on Apr. 18, 2023.
Jin, et al.: "AdaBits: Neural Network Quantization with Adaptive Bit-Widths," arXiv: 1912.09666v2 [cs.CV], (2020), pp. 1-20.

* cited by examiner

| | | c1,d1 | c2,d2 |
|---|---|---|---|
| 1 | 0 | c1_bit1 | 1 |
| 2 | 2 | c1_bit2 | 1 |
| 3 | 4 | c1_bit3 | 1 |
| 4 | 8 | c1_bit4 | 1 |
| 5 | 16 | c1_bit5 | 0 |
| 6 | 32 | c1_bit6 | c2_bit1 |
| 7 | 64 | c1_bit7 | c2_bit2 |
| 8 | 128 | c1_bit8 | c2_bit3 |
| 9 | 256 | c1_bit9 | c2_bit4 |
| 10 | 512 | c1_bit10 | c2_bit5 |
| 11 | 1024 | c1_bit11 | c2_bit6 |
| 12 | 2048 | c1_bit12 | c2_bit7 |
| 13 | 4096 | c1_bit13 | c2_bit8 |
| 14 | 8192 | c1_bit14 | c2_bit9 |
| 15 | 16384 | 0 | c2_bit10 |
| 16 | 32768 | 0 | c2_bit11 |
| 17 | 65536 | 0 | c2_bit12 |
| 18 | 131072 | 0 | c2_bit13 |
| 19 | 262144 | 0 | c2_bit14 |
| 20 | +/- | c1_bit15 | c2_bit15 |
| | | c1_bit16 (0) | c2_bit16 (1) |

| | | c1,d1 | c2,d2 | c3,d3 |
|---|---|---|---|---|
| 1 | 0 | c1_bit1 | 0 | 0 |
| 2 | 2 | c1_bit2 | 1 | 0 |
| 3 | 4 | c1_bit3 | c2_bit1 | 0 |
| 4 | 8 | c1_bit4 | c2_bit2 | 0 |
| 5 | 16 | c1_bit5 | c2_bit3 | 0 |
| 6 | 32 | c1_bit6 | c2_bit4 | 1 |
| 7 | 64 | c1_bit7 | c2_bit5 | c3_bit1 |
| 8 | 128 | c1_bit8 | c2_bit6 | c3_bit2 |
| 9 | 256 | c1_bit9 | c2_bit7 | c3_bit3 |
| 10 | 512 | 0 | c2_bit8 | c3_bit4 |
| 11 | 1024 | 0 | c2_bit9 | c3_bit5 |
| 12 | 2048 | 0 | 0 | c3_bit6 |
| 13 | 4096 | 0 | 0 | c3_bit7 |
| 14 | 8192 | 0 | 0 | c3_bit8 |
| 15 | 16384 | 0 | 0 | c3_bit9 |
| 16 | +/- | c1_bit10 | c2_bit10 | c3_bit10 |
| | | c1_bit11 (0) | c2_bit11 (1) | c3_bit11 (0) |
| | | c1_bit12 (0) | c2_bit12 (0) | c3_bit12 (1) |

METHOD FOR ENCODING AND DECODING DATA

FIELD

The present invention relates to a method for encoding data and to a method for decoding data, in particular data which have been encoded by means of the method for encoding data.

BACKGROUND INFORMATION

In the related art, for transferring information, e.g., from sensors, measurement data of different types are transmitted via digital interfaces to data processing computer units. In such a transmission, the respective resolutions and value ranges of the data to be transmitted play an essential role.

For a given static digital encoding, the required resolution and the required value range result in a requirement for the data transmission rate that must be provided as a minimum for transmitting measurement data. Requirements in this respect are defined, for example, in the PSI specification for peripheral crash sensors, the SPI specification for inertial sensors, and the SENT specification for pressure sensors, etc.

High requirements for the resolution of measurement data in combination with a large value range to be represented of such measurement data lead to particularly high requirements for a data transmission rate for known static definitions of digital encoding. However, a resulting high data transmission rate is not necessarily required in all transmission situations. For example, measured values in certain operating states of a system are often in a relatively small value range but are required with high absolute accuracy in this range (e.g., pressure values in a brake system of a vehicle are very low during most of the operating time, but a low pressure is to be detected in order to recognize a braking request of a driver). However, if the system is in operating conditions in which a larger value range is required, it may happen that measured values with the same absolute accuracy are no longer required and that an equivalent relative resolution is sufficient.

SUMMARY

According to a first aspect of the present invention, a method for encoding data is provided, which can be used particularly advantageously, but not exclusively, for encoding measured values from sensors, e.g., from sensors of vehicles, industrial plants, home automation systems, etc.

According to an example embodiment of the present invention, the method is, for example, performed by means of an evaluation unit, which is advantageously designed as an ASIC, FPGA, processor, digital signal processor, microcontroller, or similar. The method is implemented, for example, as a computer program, which is stored in a storage unit connected to the evaluation unit by information technology and/or in a storage unit integrated in the evaluation unit and can be executed by the evaluation unit.

In a first step of the method according to an example embodiment of the present invention, a datum (which originates, for example, from a sensor, a storage unit, a computer register, etc.), which represents a numerical value from a predefined maximum value range, is received. It should be pointed out that the maximum value range may be a limited value range in comparison to a value range of originally generated (sensor) data. This may be useful if a resolution of data to be encoded is to be higher than is required in a downstream processing chain of these data. By reducing the original value range of the data to the maximum value range used for the method, an amount of data generated by the data can already be reduced initially.

In a second step of the method according to an example embodiment of the present invention, a suitable encoding rule for the datum is selected from at least a first predefined encoding rule and a second predefined encoding rule, wherein the first encoding rule is provided for encoding a first value range whose lower limit corresponds to the lower limit of the maximum value range and whose upper limit corresponds to a binary number that is at least one binary position (or number of bits) smaller than a binary number used for the binary representation of the upper limit of the maximum value range.

In addition, the second encoding rule is provided for encoding a second value range whose lower limit corresponds to a binary number that is at least one binary position larger than a binary number used for the binary representation of the lower limit of the maximum value range, and whose upper limit corresponds to the upper limit of the maximum value range. In other words, the first encoding rule and the second encoding rule respectively encode different value ranges. The predefined encoding rules are stored, for example, in the aforementioned storage unit or in a different storage unit.

When selecting the encoding rule, the encoding rule whose value range contains the numerical value of the datum is always selected, wherein, in a case in which the numerical value is contained in the value ranges of a plurality of encoding rules (since the value ranges overlap, for example), the encoding rule that has the smallest lower value range limit is selected. This ensures that a numerical value currently to be encoded is always encoded with the highest possible resolution so that a total error generated by the encoding according to the present invention is kept as low as possible.

In a third step of the method according to an example embodiment of the present invention, the numerical value of the datum is encoded on the basis of the selected encoding rule by omitting all binary positions of the numerical value considered as a binary number that are of lower significance than the binary position used for the binary representation of the lower limit of the value range of the selected encoding rule (i.e., the so-called "least significant bits," LSBs for short) and by omitting all binary positions of the numerical value considered as a binary number that are of higher significance than the binary position used for the binary representation of the upper limit of the value range of the selected encoding rule (i.e., the so-called "most significant bits," MSBs for short). The binary positions of low significance are preferably omitted by shifting the binary positions of the numerical value to be encoded by a corresponding number of binary positions in the direction of the LSB (i.e., to the right).

In a fourth step of the method according to an example embodiment of the present invention, the binary number of the encoded numerical value is extended at a predefined position by predefined encoding information, which uniquely identifies the particular encoding rule used. The number of binary positions required for the encoding information depends on the number of encoding rules used for the method and can accordingly occupy one or more binary positions in the final encoded numerical value.

It should be pointed out in general that the method according to the present invention can also be performed without a binary representation and/or processing at the binary level and that the description given here on the basis of the binary representation serves only as a simplified explanation. Accordingly, the method can also be carried out in a decimal, hexadecimal, octal, or a different number system by using equivalent arithmetic operations.

It is furthermore understood that any existing encoding of the received datum, whose numerical value is to be encoded by means of the method according to the present invention, which is unsuitable for the omission according to the present invention of binary positions and/or for other processing steps of the method according to the present invention (e.g., a two's complement encoding of negative numerical values) is initially partially or completely decoded before processing by the method according to the present invention.

The method according to the present invention inter alia offers an advantage that a reduction of a required amount of data can be achieved, while smaller numerical values, which often have to be available with a particularly high accuracy, can be encoded in their original (high) resolution or with only a slight loss of resolution. The reduction according to the present invention of the required amount of data makes it possible, for example, to reduce a required storage requirement and/or a required data transmission rate and/or to accelerate a data transmission.

Preferred developments and example embodiments of the present invention are disclosed herein.

In a particularly advantageous embodiment of the present invention, a number of bits used for encoding the value ranges of the respective encoding rules is uniform for all encoding rules. This offers the advantage that, for example in connection with a transmission of the data encoded according to the present invention, a constant bit rate and/or a real-time-capable transmission can be achieved since the number of bits per numerical value to be encoded does not vary.

In a further advantageous embodiment of the present invention, at least a third encoding rule is additionally used in the present method and is provided for encoding a third value range whose lower limit corresponds to a binary number that is at least one binary position larger than a binary number used for the binary representation of the lower limit of the first value range, and whose upper limit corresponds to a binary number that is at least one binary position smaller than a binary number used for the binary representation of the upper limit of the second value range. In addition, it is advantageously possible to use fourth, fifth or more encoding rules, each with corresponding value ranges that differ from one another.

A number of binary positions located between respective binary representations of the lower limits of the respective value ranges is advantageously identical or substantially identical. "Substantially identical" refers to cases in which an identical number of binary positions is not possible due to a total number of binary positions that is provided for the encoded numerical value, and a number of encoding rules used. Accordingly, an approximately identical number of binary positions is to be included here. Alternatively, it is possible that a relevant number of binary positions located between the lower limits is higher, the higher the numerical values of the lower limits of the respective value ranges are. In this way, it is possible to achieve a correspondingly higher resolution for lower numerical values.

Advantageously, according to an example embodiment of the present invention, the respective lower and/or upper limits of the respective value ranges are dynamically adjusted depending on current boundary conditions. Possible boundary conditions with regard to a vehicle that uses the method according to the present invention include, for example, existing environmental conditions and/or recognized critical driving situations and/or a current speed of the vehicle, etc. This makes it possible in each case to adjust the method according to the present invention to the respective boundary conditions in an optimized manner. By adjusting the lower and/or upper limit, shifts in the value ranges for the respective encoding rules on the one hand and the scope of the respective value ranges can be optimally adjusted. Such a dynamic adjustment can be uniquely identified, for example, by adding an additional identifier to the encoded numerical value so that correct decoding is made possible. Alternatively or additionally, it is particularly advantageously possible to store information about such a dynamic adjustment in a separate datum, which is transmitted, for example, to a receiver of the encoded numerical value before the encoded numerical value is transmitted. For example, this information is only ever sent (e.g., via a separate transmission frame) to a receiver when the dynamic adjustments of the value ranges change, so that the receiver can in each case decode received encoded numerical values on the basis of the last information received.

Preferably, according to an example embodiment of the present invention, negative numerical values to be encoded are identified by means of a sign bit by which the encoded numerical value is extended at a predefined position. The position for the sign bit as well as the position for the encoding information and positions of any other information can basically be defined as desired.

The method according to the present invention is particularly preferably used for encoding measured values from sensors and/or for transmitting data between a transmitter and a receiver, in particular in a vehicle or in a home automation system. Possible sensors include radar sensors and/or lidar sensors and/or ultrasonic sensors and/or speed sensors and/or acceleration sensors and/or position sensors and/or temperature sensors and/or pressure sensors and/or other sensors.

Further preferably, according to an example embodiment of the present invention, each encoded numerical value is transmitted in a single transmission frame (also referred to as a frame) during a data transmission. This makes it possible to transmit with a particularly low time delay, which may play an important role, in particular in time-critical applications. Of course, this does not exclude the possibility that numerical values encoded according to the present invention can also be transmitted in segmented form between a transmitter and a receiver.

According to a second aspect of the present invention, a method for decoding data is provided, wherein the data to be decoded are preferably data that have been encoded by means of a method for encoding data according to the above-described embodiments of the present invention.

In a first step of the method according to an example embodiment of the present invention, a datum comprising an encoded numerical value and encoding information corresponding to the encoded numerical value is received. The process of receiving and the further processing described below take place, for example, by means of an evaluation unit, which is preferably designed similarly or identically to an evaluation unit described above for encoding data.

In a second step of the method according to an example embodiment of the present invention, a predefined decoding rule for decoding the encoded numerical value is selected, depending on the encoding information, from at least a first predefined decoding rule and a second predefined decoding rule. Advantageously, the encoding rules are stored in a storage unit connected to the evaluation unit by information technology. Preferably, respective decoding rules of the method according to the second aspect of the present invention correspond to respective encoding rules of the method according to the first aspect of the present invention in such a way that numerical values encoded by means of the respective encoding rules can be reconstructed by the respective decoding rules completely or with a resolution error introduced by the encoding.

In a third step of the method according to an example embodiment of the present invention, in order to generate a decoded binary number, the encoded numerical value considered as a binary number is shifted in the direction of binary positions of a higher significance by a number of binary positions that is defined by the selected decoding rule. The decoded binary number has a predefined number of target binary positions that is at least large enough that a predefined maximum value range used in the encoding of the numerical value can be represented by means of the decoded binary number. In addition, binary positions of the decoded binary number that are of higher significance than the highest binary position occupied by the shifted binary number are assigned values of 0, and binary positions of the decoded binary number that are of lower significance than the lowest binary position occupied by the shifted binary number are assigned predefined replacement values. Preferably, the replacement values are selected in such a way that an average error in the reconstruction of the decoded numerical values with respect to the originally encoded numerical values is minimized as far as possible, without necessarily requiring such a minimization.

When defining the replacement values, it is provided, for example, to assign values of 0 to each binary position of the decoded binary number to be filled by means of the replacement values, or to assign values of 1 to each binary position of the decoded binary number to be filled by means of the replacement values. It is also particularly advantageously possible to assign a value of 1 to the most significant binary position of the binary positions of the decoded binary number to be assigned replacement values and to assign a value of 0 to the other binary positions to be assigned replacement values, or to assign a value of 0 to the most significant binary position of the binary positions of the decoded binary number to be assigned replacement values and to assign a value of 1 to the other binary positions to be assigned replacement values.

BRIEF DESCRIPTION OF THE DRAWINGS

Exemplary embodiments of the present invention are described in detail below with reference to the figures.

DETAILED DESCRIPTION OF EXAMPLE EMBODIMENTS

Figure 1:
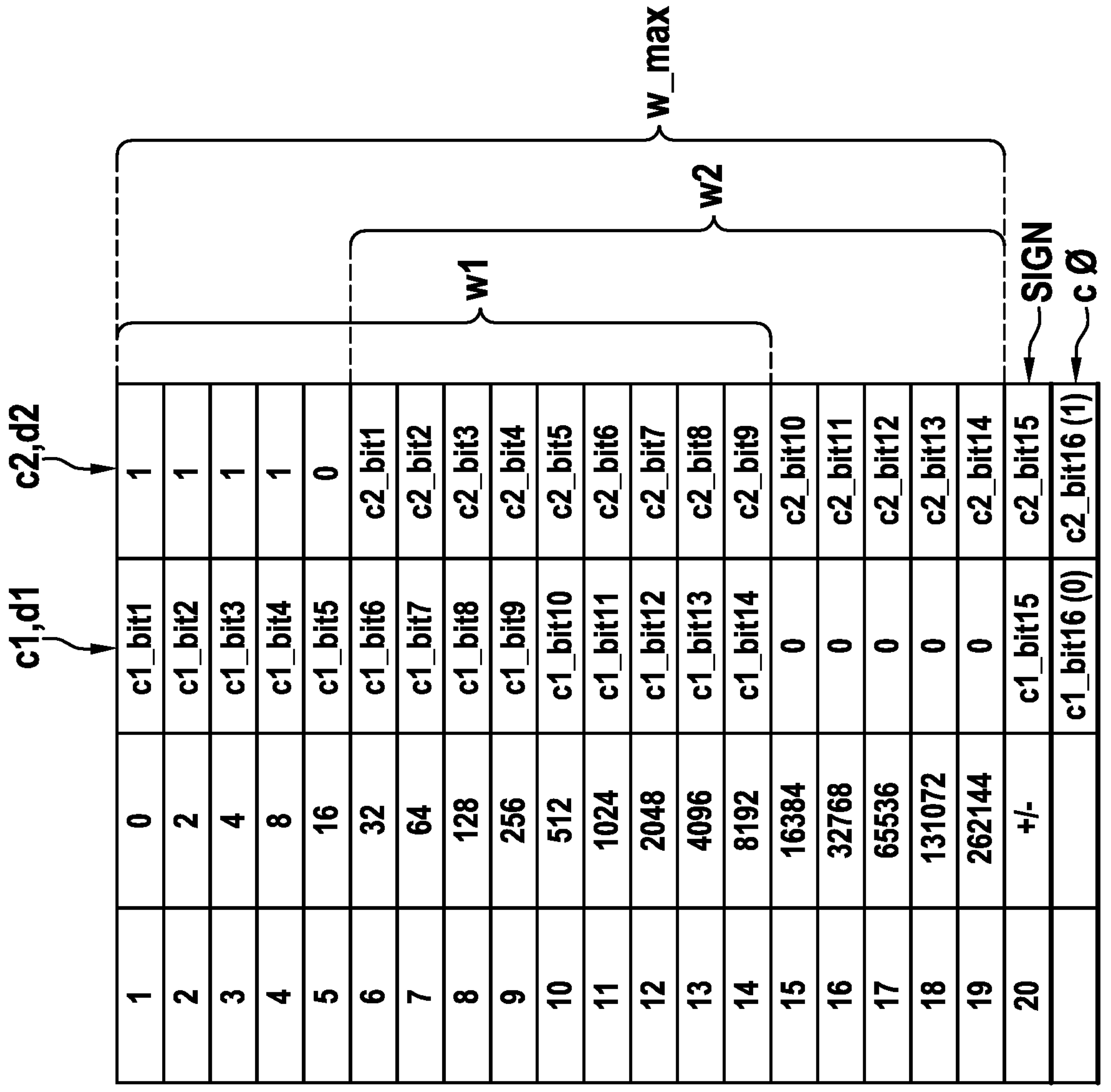
FIG. 1 shows a first exemplary embodiment of predefined encoding rules according to the present invention and of predefined decoding rules corresponding thereto.

FIG. 1 shows a first exemplary embodiment of encoding rules c1, c2 according to the present invention and of decoding rules d1, d2 corresponding thereto.

It should be pointed out that a representation (in particular a data representation, e.g., in a storage unit) of the respective encoding rules c1, c2 and the decoding rules d1, d2 respectively corresponding thereto can be identical. In the example shown here, all information required for encoding and decoding numerical values is provided in the same table, wherein use of separate encoding rules c1, c2 and decoding rules d1, d2, each of which contains only the information required for encoding or decoding, is also explicitly possible.

It should furthermore be pointed out that encoding according to the present invention of numerical values and decoding according to the present invention of numerical values can always be carried out independently of one another, regardless of a common or a separate representation of the encoding/decoding rules.

In its first column from the left, the table shown in FIG. 1 has a consecutive number, which represents the respective bits or binary positions of a maximum value range w_max, wherein the maximum value range w_max relates here, for reasons of representation, to an amount, i.e., a range of positive numerical values, and a sign bit SIGN is provided as an additional 20th bit to represent both positive and negative numerical values. In this context, it should be explicitly pointed out that the method according to the present invention can also be carried out with maximum value ranges w_max that do not have negative numerical values (e.g., pressure, temperature, distance). In such cases, the 20th bit is preferably used additionally to represent the positive value range.

In its second column from the left, the table shown in FIG. 1 has the respective lower limits of the respective encoding/decoding rules.

The third column from the left represents the first encoding rule c1 and the first decoding rule d1 with a value range w1, while the fourth column from the left represents the second encoding rule c2 and the second decoding rule d2 with a value range w2.

A numerical value that is to be encoded by means of the method according to the present invention and whose amount is within the maximum value range w_max is received as a datum by an evaluation unit.

On the basis of the magnitude of the numerical value, the evaluation unit selects the encoding rule c1, c2 for encoding the numerical value in whose value range w1, w2 the numerical value falls, wherein, in a case in which the numerical value is contained in the value ranges w1, w2 of a plurality of encoding rules c1, c2, the encoding rule c1, c2 that has the smallest lower value range limit is always selected.

In a specific example, a numerical value of 2000 is encoded, which is contained in the value ranges w1, w2 of both encoding rules c1, c2. According to the specification described above, the first encoding rule cl is accordingly selected to encode the numerical value, and the amount of the numerical value is encoded with 14 bits (c1_bit1 to c1_bit14).

The sign bit SIGN, which here represents a positive value, is now added as the 15th bit to the encoded numerical value.

Additional encoding information c0, which here indicates the use of the first encoding rule c1, is added as the 16th bit to the encoded numerical value.

In the case of a numerical value of, for example, 55555 to be encoded, the second encoding rule c2 is accordingly used for encoding. The LSBs, i.e., bits 1 to 5 in the fourth column from the left, are omitted so that, due to an associated reduction in resolution, a corresponding error is introduced when using the second encoding rule c2.

Since the number of bits provided for encoding is here defined identically in the respective encoding rules c1, c2, encoded numerical values are generated accordingly with a uniform bit length, which allows a constant data rate to be achieved when transmitting the numerical values encoded in this way.

In addition, it is possible, for example, to adjust the respective limits of the value ranges w1, w2 depending on current boundary conditions and to transmit relevant information about the adjustments from a transmitter, which is configured to carry out the encoding of numerical values, to a receiver, which is configured to carry out the decoding of numerical values, by means of additional transmission frames from the transmitter to the receiver so that correct decoding of transmitted data on the basis of this information is ensured at all times.

The method according to the present invention can be used particularly advantageously for encoding measured values from sensors of a vehicle, which are encoded, for example, by the sensors themselves and are subsequently transmitted to a control device of the vehicle which corresponds to the sensors and in which decoding of the measured values from the sensors takes place. Particularly preferably, each encoded measured value is transmitted in a single transmission frame.

In order to decode the encoded numerical value, the binary positions of the encoded numerical value are first shifted, depending on the encoding rule c1, c2 used, to the position at which they were before encoding. MSBs omitted during encoding are filled with values of "0" during decoding by means of the first decoding rule d1, while LSBs are filled with replacement values during decoding by means of the second decoding rule d2, which are defined with respect to bits 1 to 5 in the fourth column from the left in the table.

Figure 2:
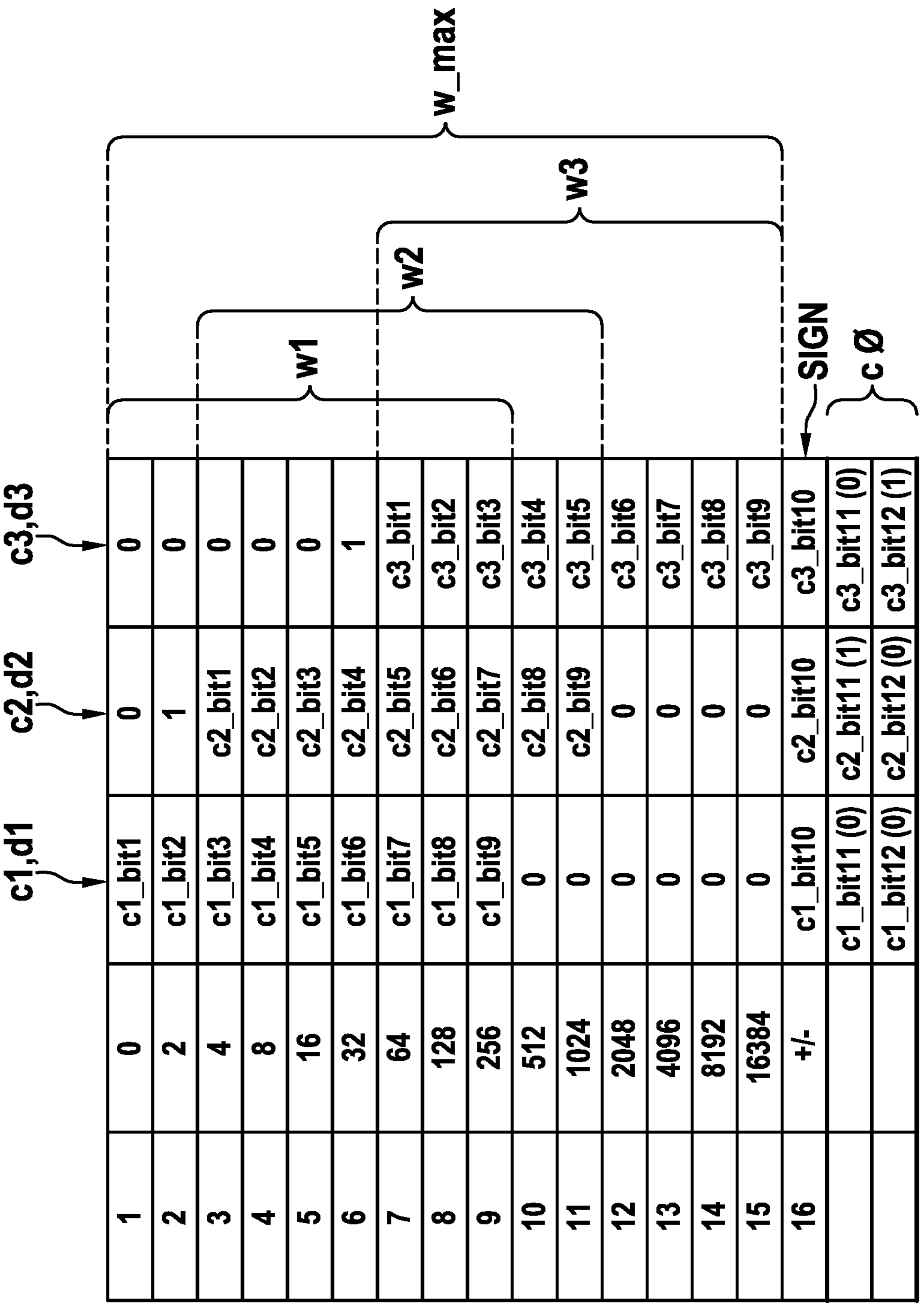
FIG. 2 shows a second exemplary embodiment of predefined encoding rules according to the present invention and of predefined decoding rules corresponding thereto.

FIG. 2 shows a second exemplary embodiment of encoding rules c1, c2, c3 predefined according to the present invention and of decoding rules d1, d2, d3 corresponding thereto. Due to numerous matches between the table in FIG. 1 and the table in FIG. 2, only the differences between the two tables are described below to avoid repetitions.

In FIG. 2, the maximum value range w_max including the sign bit SIGN corresponds to only 16 bits. In addition, a third encoding rule c3 and a third decoding rule d3 with a third value range w3 are provided. The lower limits of the value ranges w1, w2, w3 are each defined in such a way that the distance between the lower limits and higher values increases. This results in a correspondingly smaller error when encoding smaller values than when encoding larger values.

For uniquely identifying the encoding rule c1, c2, c3 used in each case, two bits are required in the encoding information co to be held available.

In addition, partially different replacement values are defined here in comparison to the table in FIG. 1.

The invention claimed is:

1. A method for encoding data, comprising the following steps:

receiving a digital datum representing a numerical value from a predefined maximum value range;

selecting a suitable encoding rule for the digital datum from at least a first predefined encoding rule and a second predefined encoding rule, wherein:

the first predefined encoding rule is provided for encoding a first value range whose lower limit corresponds to a lower limit of the maximum value range and whose upper limit corresponds to a binary number that is at least one binary position smaller than a binary number used for a binary representation of an upper limit of the maximum value range, the second predefined encoding rule is provided for encoding a second value range whose lower limit corresponds to a binary number that is at least one binary position larger than a binary number used for a binary representation of the lower limit of the maximum value range, and whose upper limit corresponds to the upper limit of the maximum value range, an encoding rule of the first and second predefined encoding rules whose value range contains the numerical value of the digital datum is selected, wherein, in a case in which the numerical value is contained in the first and second value ranges of a plurality of the first and second predefined encoding rules, the encoding rule that has the smallest lower value range limit is selected, encoding the numerical value of the digital datum based on the selected encoding rule including:

omitting all binary positions of the numerical value of the digital datum considered as a binary number that are of lower significance than a binary position used for the binary representation of the lower limit of the value range of the selected encoding rule, and omitting all binary positions of the numerical value of the digital datum considered as a binary number that are of higher significance than the binary position used for a binary representation of the upper limit of the value range of the selected encoding rule; and extending a binary number of the encoded numerical value at a predefined position by predefined encoding information, which uniquely identifies the selected encoding rule used in each case.

2. The method according to claim 1, wherein a number of bits used for encoding the first and second value ranges of the respective first and second predefined encoding rules is uniform for all encoding rules.

3. The method according to claim 1, wherein at least a third encoding rule is additionally used, which is provided for encoding a third value range:

whose lower limit corresponds to a binary number that is at least one binary position larger than a binary number used for the binary representation of the lower limit of the first value range, and whose upper limit corresponds to a binary number that is at least one binary position smaller than a binary number used for the binary representation of the upper limit of the second value range.

4. The method according to claim 3, wherein a number of binary positions located between respective binary representations of the lower limits of the first, second, and third value ranges is:

identical or substantially identical, or higher, the higher the numerical values of the lower limits of the respective first, second, and third value ranges are.

5. The method according to claim 1, wherein respective lower and/or upper limits of the respective first and second value ranges are dynamically adjusted depending on current boundary conditions.

6. The method according to claim 1, wherein negative numerical values to be encoded are identified by a sign bit by which the encoded numerical value is extended at a predefined position.

7. The method according to claim 1, wherein the method is used to:

encode measured values from sensors, and/or transmit data between a transmitter and a receiver, in a vehicle or in a home automation system.

8. The method according to claim 7, wherein each encoded numerical value is transmitted in a single transmission frame during a data transmission.

9. A method for decoding data, comprising the following steps:

receiving a digital datum including an encoded numerical value and encoding information corresponding to the encoded numerical value;

selecting, depending on the encoding information, a predefined decoding rule for decoding the encoded numerical value from at least a first predefined decoding rule and a second predefined decoding rule;

shifting the encoded numerical value considered as a binary number in a direction of binary positions of higher significance by a number of binary positions defined by the selected decoding rule, to generate a decoded binary number;

wherein the decoded binary number has a predefined number of target binary positions that is at least large enough that a predefined maximum value range used in the encoding of the numerical value can be represented by the decoded binary number, and binary positions of the decoded binary number:

that are of higher significance than a highest binary position occupied by the shifted binary number are assigned values of zero, and that are of lower significance than a lowest binary position occupied by the shifted binary number are assigned predefined replacement values.

10. The method according to claim 9, wherein, it is provided for the replacement values:

that values of 0 are assigned to each binary position of the decoded binary number to be filled by the replacement values, or that values of 1 are assigned to each binary position of the decoded binary number to be filled by the replacement values, or that a value of 1 is assigned to the most significant binary position of the binary positions of the decoded binary number to be assigned replacement values and that a value of 0 is assigned to the other binary positions to be assigned replacement values, or that a value of 0 is assigned to the most significant binary position of the binary positions of the decoded binary number to be assigned replacement values and that a value of 1 is assigned to the other binary positions to be assigned replacement values.

* * * * *